United States Patent [19]

Park

[11] Patent Number: 5,990,902
[45] Date of Patent: Nov. 23, 1999

[54] APPARATUS AND METHOD FOR PREFETCHING TEXTURE DATA IN A VIDEO CONTROLLER OF GRAPHIC ACCELERATORS

[75] Inventor: Jong-Hwa Park, Kyunggi-do, Rep. of Korea

[73] Assignee: Samsung Electronics Co., Ltd., Suwon, Rep. of Korea

[21] Appl. No.: 08/897,448

[22] Filed: Jul. 22, 1997

[30]    Foreign Application Priority Data

Jul. 23, 1996 [KR] Rep. of Korea ...................... 96-29791

[51] Int. Cl.[6] ...................................................... G06T 1/60
[52] U.S. Cl. .......................... 345/430; 345/422; 345/503; 345/505; 345/520; 345/521
[58] Field of Search .................................... 345/419, 422, 345/430, 503, 505, 520, 521

[56]            References Cited

U.S. PATENT DOCUMENTS 5,450,550  9/1995  Ito et al. .................................. 345/419
5,664,162  9/1997  Dye .......................................... 345/521

*Primary Examiner*—Mark R. Powell
*Assistant Examiner*—Kimbinh T. Nguyen
*Attorney, Agent, or Firm*—Jones Volentine, L.L.P.

[57]            ABSTRACT

A video controller in a graphic accelerators suitable for use in three dimensional graphics and texture mapping is disclosed. The controller includes an address generator for generating addresses for reading out texture data stored in the video memory and a mode register for generating a directional signal for prefetching the texture data. A prefetch controller is provided to produce an address for another texture data predicted to be used at the next time, based on the directional signal supplied from the mode register and the address of the address generator. Also provided are a memory controller for accessing the texture data corresponding to the address generated in the prefetch controller via the memory interface, and a buffer memory for storing the prefetched texture data outputted from the memory controller and the address of the prefetched texture data. Further, the prefetching method comprises the steps of determining whether the address generated at the address generator is identical with the one stored in the buffer memory; outputting the texture data stored in the buffer memory if said two addresses are identical and determining whether prefetching of the texture data is possible; addressing the texture data corresponding to the address provided by the address generator, if two addresses are not identical; prefetching a texture data predicted to be used next time in the video memory based on the directional signal supplied from the mode register and the address supplied from the address generator, if the prefetching is possible; and storing the prefetched texture data and its corresponding address into the buffer memory. The video controller of this invention considerably reduces the time required for accessing the video memory since prefetched texture data is read out in the internal buffer register without accessing the same in the outer video memory.

7 Claims, 5 Drawing Sheets

Fig. 5

| (u−1,v−1) | (u,v−1) | (u+1,v−1) |
|---|---|---|
| (u−1,v) | (u,v) | (u−1,v) |
| (u−1,v+1) | (u,v+1) | (u+1,v+1) |

Fig. 6

| Mode \ Byte Enable | BE0 | BE1 | BE2 | BE3 | BE4 | BE5 | BE6 | BE7 |
|---|---|---|---|---|---|---|---|---|
| MODE0 | (u+1, v) | | | | | | | |
| MODE1 | (u, v+1) | | | | | | (u+1, v+1) | |
| MODE2 | (u, v+1) | | | | | | | |
| MODE3 | (u−1, v+1) | | (u, v+1) | | | | | |
| MODE4 | (u−1, v) | | | | | | | |
| MODE5 | (u−1, v−1) | | (u, v−1) | | | | | |
| MODE6 | (u, v−1) | | | | | | | |
| MODE7 | (u, v−1) | | | | | | (u+1, v−1) | |

APPARATUS AND METHOD FOR PREFETCHING TEXTURE DATA IN A VIDEO CONTROLLER OF GRAPHIC ACCELERATORS

FIELD OF THE INVENTION

The present invention relates to a video controller for graphic accelerators, and more particularly to a video controller for graphic accelerators for use in three dimensional graphics and texture mapping.

BACKGROUND OF THE INVENTION

The graphic card or graphic board provided with personal computers functions as a hardware interface with a display device. Most of the modem graphic boards have graphic accelerators which provides the ability to quickly move data to video memory from other places in the computer. Furthermore, the recent trends in display circuitry designs have focused on minimizing the need to move large blocks of video data from one place to another. By constructing and manipulating the on-screen image with processor power that is directly to video memory, massive transfers of video data can be minimized. Because less data moves across the system bus, there is less of a handicap from bus overhead no matter whether the I/O bus or a local bus is used as the transfer channel. A typical graphic board is shown in FIG. 1 for the purpose of explanation. The graphic board 101 comprises a graphic accelerator 100, a clock generator 30, a video memory 40, a RAMDAC 50, and a BIOS ROM 60. A local bus, for example the PCI bus to connected to the graphic accelerator 100 and the BIOS ROM 60 of the graphic board. The video data processed in the graphic accelerator 100 is suppled with a display monitor 11 through the RAMDAC 50 that includes a color look-up table and a digital-to-analog converter.

Especially, the graphic accelerator 100 has been improved to contribute to three dimensional games or graphics. In order to implement the 3-D graphics, well known texture mapping techniques are widely used. In brief, the texture mapping allows the graphic accelerator to calculate the memory address of the desired 3-D image to read out the texture data stored in the video memory 40 and again write into the frame buffer.

During the texture mapping, the performance of the graphic board has a great influence on how fast the graphic accelerator reads out the desired texture data or image from the video memory. Thus, it is desirable that the time required for accessing the video memory be reduced as much as possible.

SUMMARY OF THE INVENTION

It is therefore an object of the invention to provide a graphic accelerator which can read out the texture data from the video memory in a more fast way.

In accordance with the present invention, a novel video controller is provided in the graphic accelerator. The video controller comprises an address generator for generating addresses for reading out texture data stored in the video memory; a mode register for generating a directional signal for prefetching the texture data; a prefetch controller for producing an address for another texture data predicted to be used at the next time, based on the directional signal supplied from the mode register and the address of the address generator; a memory controller for accessing the texture data corresponding to the address generated in the prefetch controller via the memory interface; and a buffer memory for storing the prefetched texture data outputted from the memory controller and the address of the prefetched texture data.

In accordance with another aspect of the present invention, the prefetching method comprises the steps of generating an address for reading out a texture data stored in the video memory; determining whether the address generated at the address generator is identical with the one stored in the buffer memory; outputting the texture data stored in the buffer memory if said two addresses are identical and determining whether prefetching of the texture data is possible; addressing the texture data corresponding to the address provided by the address generator, if two addresses are not identical; prefetching a texture data predicted to be used next time in the video memory based on the directional signal supplied from the mode register and the address supplied from the address generator, if the prefetching is possible; and storing the prefetched texture data and its corresponding address into the buffer memory.

According to this invention, the prefetching method is based on the fact that the texture data has a predetermined direction and the direction is much more predictable when the texture mapping is carried out. The video controller stores the texture data or image determined to be used next time in the buffer memory by prefetching the texture data through the memory controller. Thus, it is possible to read out the texture data from the buffer memory faster than it can be read out from the video memory.

BRIEF DESCRIPTION OF THE DRAWINGS

This invention may be understood and its object and advantages will become apparent to those skilled in the art by reference to the accompanying drawings as follows;

FIG. 5 is a diagram showing an address map of a texture data; and

FIG. 6 is a diagram for showing a directional addressing mode for the texture data shown in FIG. 5 in accordance with the present invention.

DETAILED DESCRIPTION OF PREFERRED EMBODIMENTS

Figure 1:
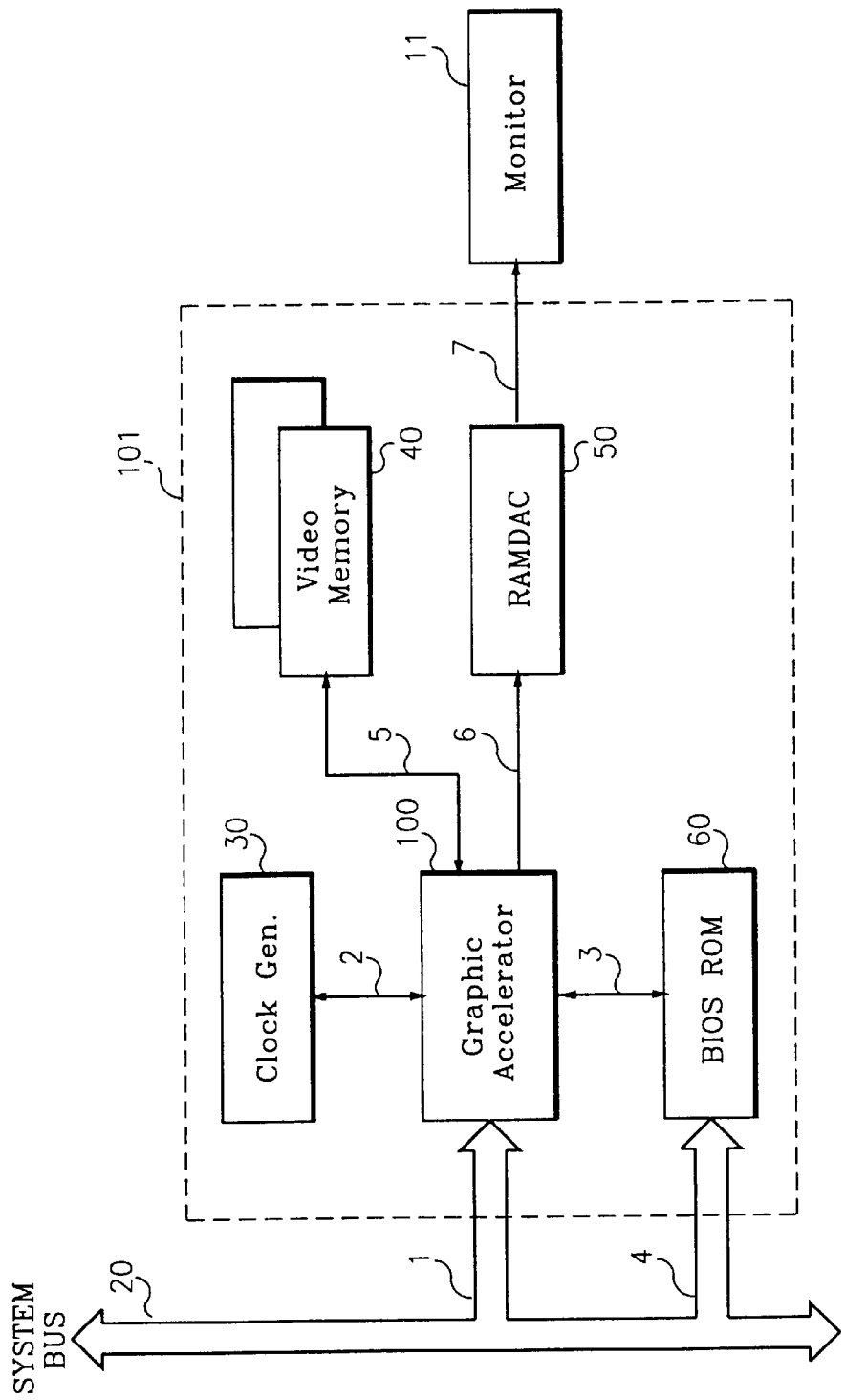
FIG. 1 is a block diagram of a conventional display adapter used in a computer system.

The preferred embodiment of this invention will be described in detail with reference to FIG. 2 and FIG. 3, where like or the same constitutional elements are denoted by the same reference numeral.

Figure 2:
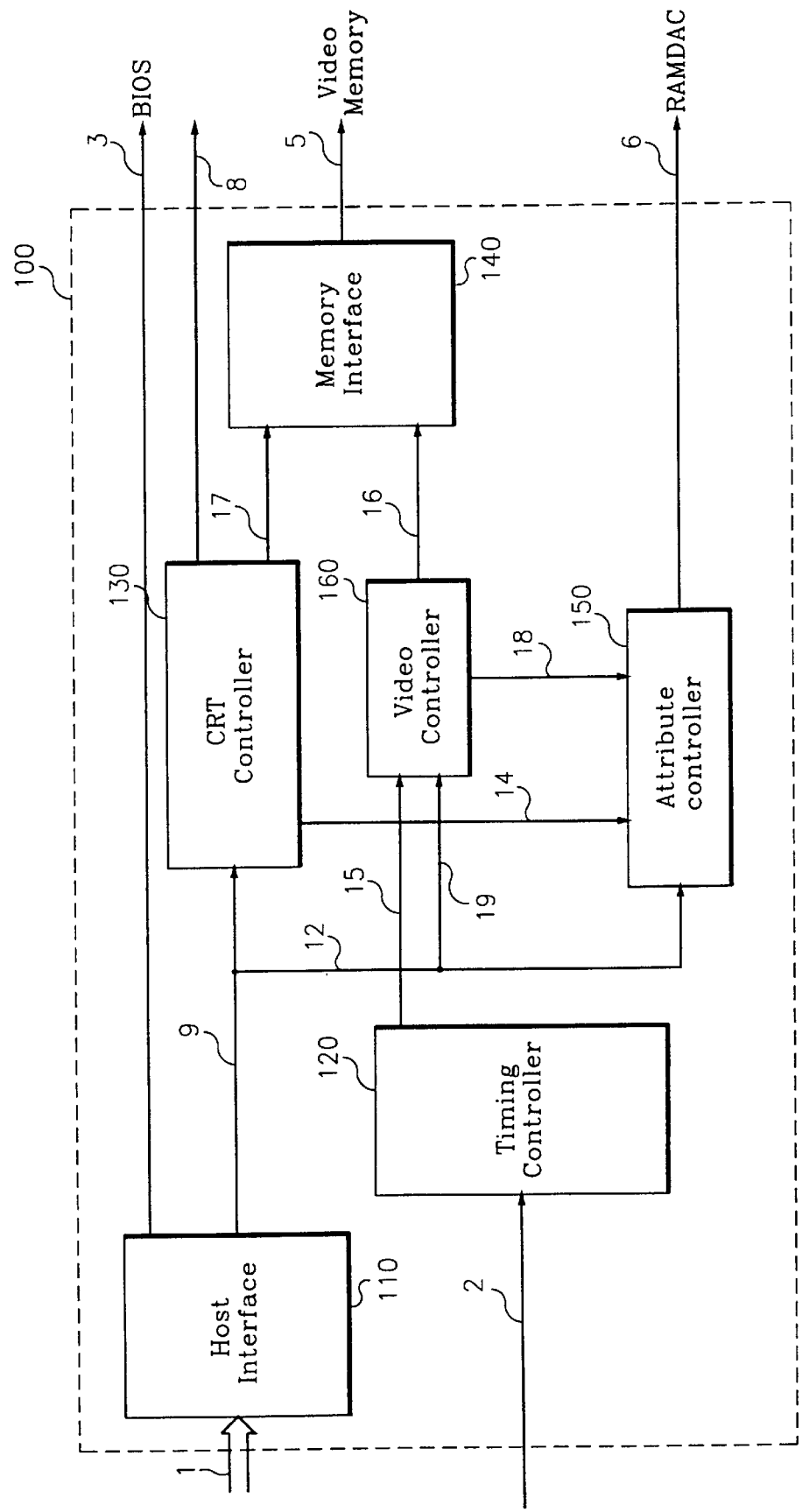
FIG. 2 is a block diagram depiction of a graphic accelerator for use in the display adapter of the present invention.

Referring to FIG. 2, there is shown a graphic accelerator 100 for use with the graphic board in accordance with the invention. The graphic accelerator 100 comprises a host interface 110, a timing controller 120, a CRT controller 130, a memory interface 140, an attribute controller 150, and a video controller 160. The host interface 110 connects the graphic accelerator 100 with the system bus. The CRT controller 130 produces video synchronization signals and refresh timing signals for controlling a raster display device in response to the control signal applied through the host interface 110. Also, the timing controller 120 generates timing clock signals for use in the graphic accelerator 100 based on a clock input signal 2 supplied from the clock generator of the graphic board.

The video controller 160 is located at the data path between the central processing unit (CPU) of the computer and the video memory 40 in order to convert memory bytes into video signals in response to the control signal supplied from the CPU through the host interface 110 and the timing signal supplied from the timing controller 120. This video controller 160 also simplifies the drawing operation, and performs memory management functions required for using a graphic mode in a bitmat format at as well as for controlling video signals.

Further, the attribute controller 150 converts the color information of bitmapped images stored in the video memory into the color information of the raster display device based on the internal color look-up table. The attribute controller 150 also controls parallel-serial conversion of color and data, border line formation, and a panning function.

Figure 3:
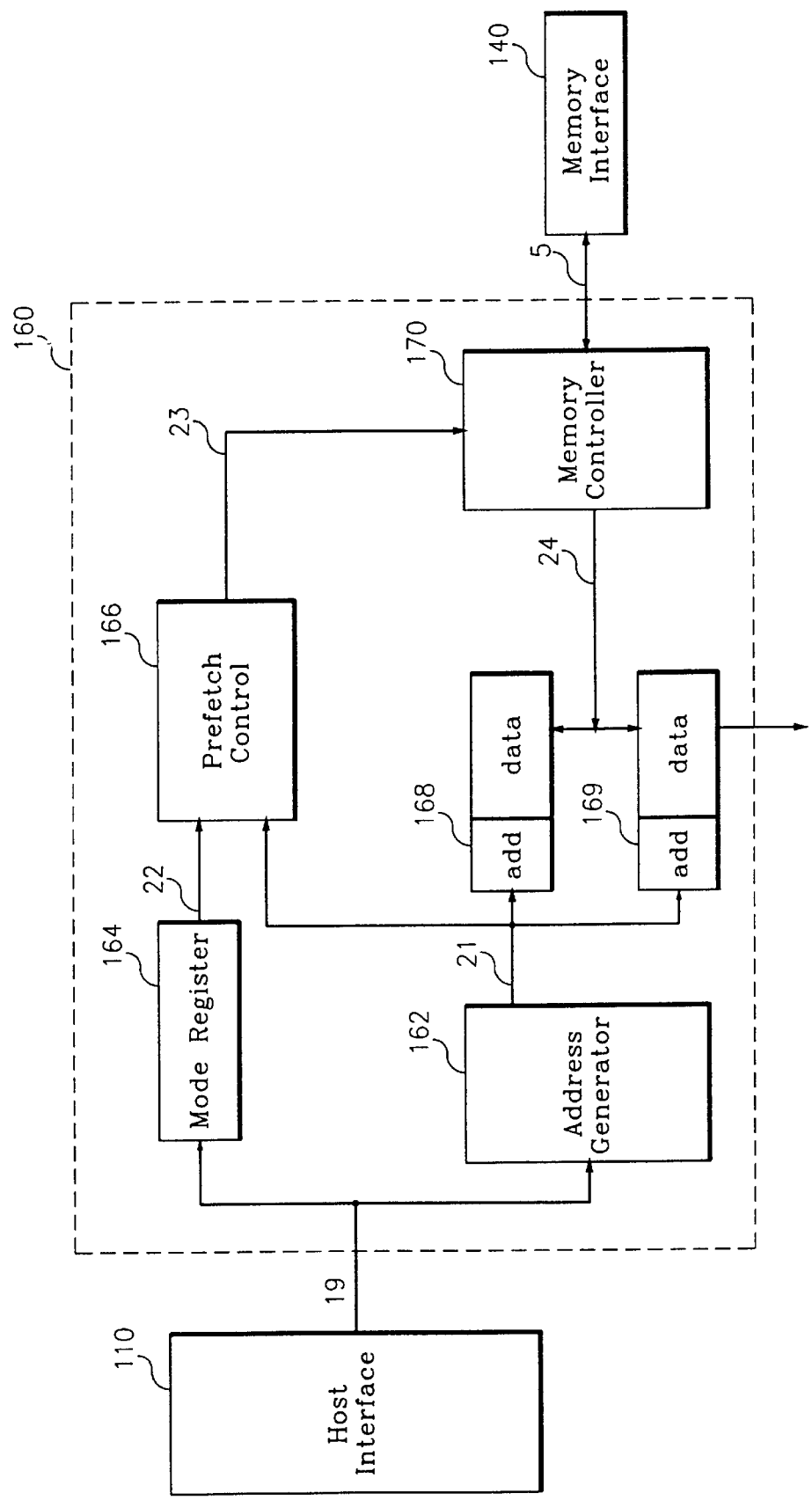
FIG. 3 is a functional block diagram depicting a video controller shown in FIG. 2 in accordance with the present invention.

The detailed block diagram of the video controller 160 is shown in FIG. 3. There, coupled with the host interface 110 are an address generator 162 and a mode register 164. The address generator 162 generates addresses for reading out texture data stored in the video memory 40 in response to the input signal fed from the host interface 110. Also, the mode register 164, in response to the input signals, produces a directional signal for prefetching the texture data. Output signals from the address generator 162 and the mode register 164 are supplied with a prefetch control circuit 166. This prefetch control circuit 166 produces an address for the next-to-be-readout texture data based on the directional signal supplied from the mode register 164. The address output of the prefetch control circuit 166 is supplied with a memory controller 170 to access the corresponding texture data in the video memory via the memory interface 140. Also, the address output of the address generator 162 is connected with inputs of dual buffers 168, 169, and the data output of the memory controller 170 is coupled with the dual buffers 168, 169. The buffers 168, 169 store the prefetched texture data outputted from the memory controller 170 and the address of the prefetched texture data.

With this arrangement, it is possible to store the texture data or image determined to be used next in the buffer memory 168, 169 of the video controller 160, by prefetching the texture data through the memory controller 170. Thus, it is possible to read out the texture data from the buffer memory faster than it is to read the texture data from the video memory. The prefetching method is based on the fact that the texture data has a predetermined direction and the direction is much more predictable when the texture mapping is carried out. This prefetching method according to the invention will be described later in detail with reference to the flow chart of FIG. 4.

In FIG. 5, there is shown an address map representing the location of texture data, where, if the address of a texture data is expressed by 'u' and 'v', the address for the presently used texture data is expressed by (u, v), and its peripheral addresses by (u±1, v±1). Further, a directional address changing map in the above address (u, v) is shown in FIG. 6. This address map represents a memory prefetching direction at a specific operation mode, relative to the byte enable signals BE0–BE7. The read out texture data at one time will be 64 bits, and at address (u, v), there maybe designated eight sets of 8-bit data or four sets of 16-bit data.

At mode 0, as represented by (u+1, v), the address is changed in the direction that the value 'u' is increasing sequentially. In this mode, when an address miss occurs in the memory, addresses (u, v) and (u+1, v) are read out at once and stored into the first and second buffers 168 and 169, respectively.

At mode 2, the address is changing in the direction that the value 'v' is increasing sequentially as represented by (u, v+1). In this mode, the page break may occur in the memory, address (u, v) is first read out, and (u, v+1) is read out by the prefetch controller 166 and stored into the second buffer 169. When the address stored in the second buffer 169 and the one generated by the address generator 162 have the same value, the texture mapping in progress is managed to proceed and prefetching the texture data predicted to be used next is performed.

At modes 4 and 6, the address changing operations are performed similar to those in the modes 0 and 2; but the directions are opposite thereto and the read out addresses will be (u−1, v), (u, v) and (u, v−1), (u, v). Basically, the above-mentioned modes 0, 2, 4, and 6 may increase the read out speed of the texture data.

At modes 1, 3, 5, and 7, the address changing is performed in a diagonal direction. For example at mode 1, when the address is changing in the direction that all of the address u, v are being increased and if the texture data in process is the first address of (u, v), there is every probability that the next address will be (u, v+1). Similarly, if the data in the process is the last address of (u, v), there is every probability that the next address will be the first data of address (u+1, v+1). Considering this, in modes 1, 3, 5, and 7, the prefetching method is adapted to each address changing direction.

Figure 4:
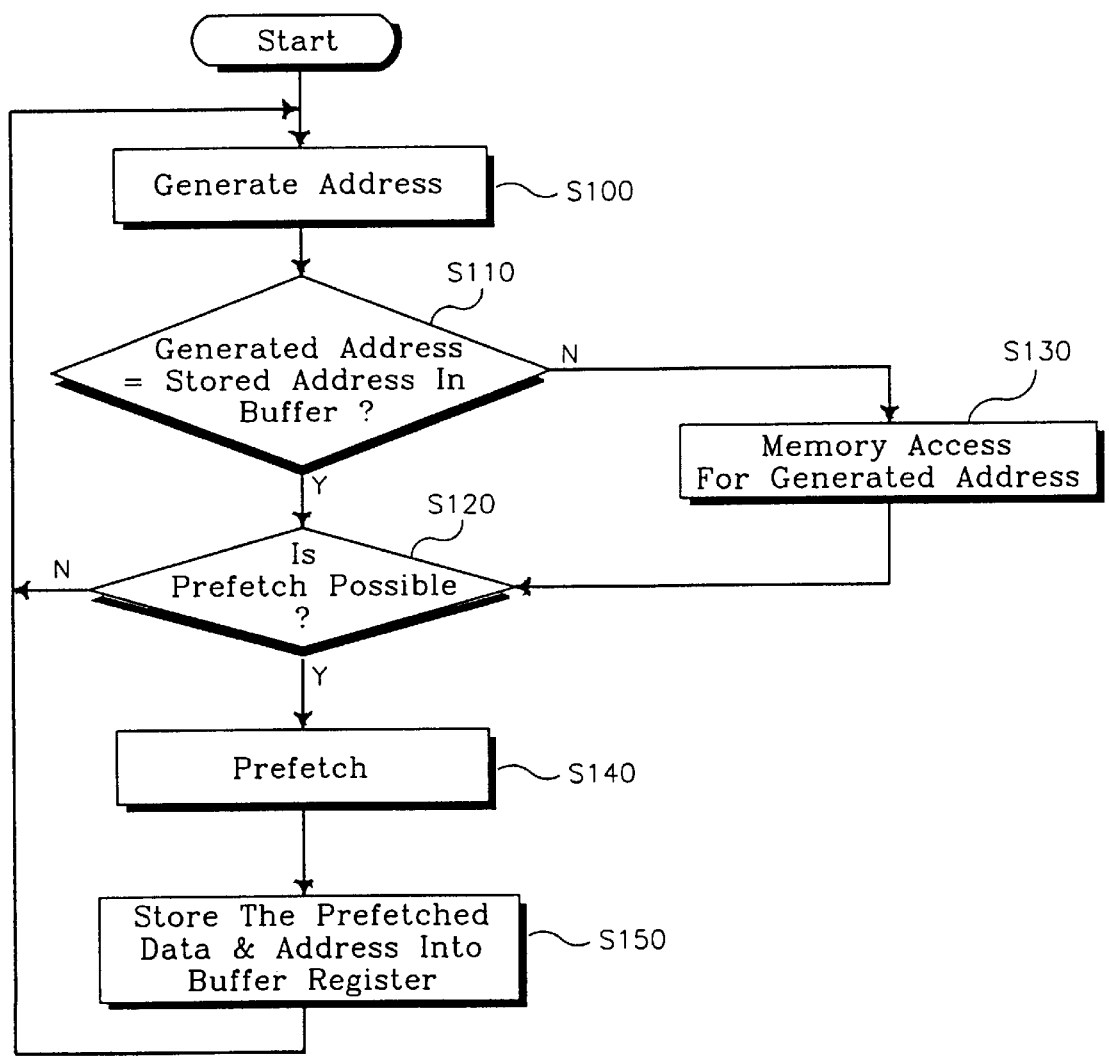
FIG. 4 is a flow diagram showing a prefetching method performed in the memory controller of FIG. 3.

FIG. 4 shows the memory prefetching method performed in the prefetch controller 166. The prefetching method will be described with reference to the flow chart of FIG. 4 and the directional address map of FIG. 6.

First, in step 100, an address for reading out a texture data stored in the video memory 40 is generated at the address generator 162. Then, the address generated at the address generator 162 is compared with the one stored in the buffer memory 168, and the determination is made whether the two addresses are identical at step 110. If said two addresses are identical, the texture data stored in the buffer memory is outputted and the determination is made at step 120 whether prefetching the data is possible.

On the contrary, if two addresses are not identical, addressing the texture data corresponding to the address provided by the address generator is performed in step 130.

Meanwhile, if the prefetching is not possible at step 120, processing returns to the address generating step 100 in order to generate the next address, and on the contrary, if the prefetching is possible, prefetching the texture data predicted to be used next in the video memory 40 is performed in step 140. This prefetching operation is carried out such that the prefetch controller 166 generates the address for the texture data that will be used next based on the directional signal 22 supplied from the mode register 164 and the address outputted from the address generator 162.

Finally, in step 150, the prefetched texture data and its corresponding address are stored into the buffer memories 168, 169. At this time, the memory controller 170 reads out the texture data in 32-bits or 64-bits unit that is accessible at one time. Then, it returned to the address generating step 100 in order to generate the next address.

As mentioned above, the mode register 164 determines the direction of prefetching. In this regard, how the mode register 164 should be set will be described. The method may be divided into two categories. One is direct writing the direction method by using a software program, and the other is self determining the direction method based on the variation of the address by using a hardware device. In this invention, the direct writing the direction method by using a software program is adopted.

Programming the mode register 164 can be carried out when the texture mapping command register is written, since it is much more predictable that the direction of the texture address is changed uniformly in a triangle of the texture mapping.

As is apparent from the foregoing, the prefetching method of the present invention provides a video controller which can reduce the video memory access time since prefetched texture data is read out in the internal buffer register without accessing the same in the outer video memory. Thus, overall processing time of the texture data can be reduced, which will result in enhancing the performance of a graphic accelerator used in processing three dimensional graphics and texture mapping.

While the invention has been described in terms of an exemplary embodiment, it is contemplated that it may be practiced as outlined above with modifications within the spirit and scope of the appended claims.

What is claimed is:

1. In a graphic accelerator for processing three dimensional graphics and texture mapping, having a host interface connected with a computer system bus, a CRT controller for producing video synchronization signals and a refresh timing signals for controlling raster display device, and a video controller located at the data path between the computer and a video memory in order to convert memory bytes into video signal, said video controller comprising:

an address generator for generating a texture data address for reading out texture data stored in the video memory in response to the input signal fed from the host interface;

a mode register for generating a directional signal;

a prefetch controller for producing a prefetch address for prefetched texture data predicted to be used in a next read operation, based on the directional signal and the texture data address;

a memory controller for accessing the prefetched texture data corresponding to the prefetch address via the memory interface; and a buffer memory for storing the prefetched texture data and the prefetch address.

2. The video controller as claimed in claim 1, wherein the buffer memory includes dual buffer registers, in which an output of the address generator is connected with inputs of the dual buffer registers and a data output of the memory controller is coupled with the dual buffer registers.

3. In a video controller comprising an address generator for generating a texture data address for reading out texture data stored in the video memory, a mode register for generating a directional signal, a prefetch controller for producing a prefetch address for prefetched texture data predicted to be used in a next read operation, based on the directional signal and the texture data address, a memory controller for accessing the prefetched texture data corresponding to the prefetch address via a memory interface, and a buffer memory for storing the prefetched texture data and the prefetch address, said prefetching method comprising:

generating a current address for reading out current texture data stored in the video memory in a current read operation;

determining whether the current address is identical to the prefetch address;

outputting the prefetched texture data stored in the buffer memory if the current address is identical to the prefetch address, and determining whether prefetching of next texture data is possible;

addressing the current texture data corresponding to the current address, if the current address is not identical to the prefetch address;

prefetching next texture data predicted to be used in a next read operation in the video memory based on the directional signal and the current address, if the prefetching is possible; and storing the prefetched next texture data and its corresponding next address into the buffer memory, if the prefetching is performed.

4. The prefetching method as claimed in claim 3, further comprising the step of returning to the address generating step in order to generate the next address, if the prefetching is not possible.

5. The video controller as claimed in claim 1, wherein the mode register generates the directional signal in response to the input signal fed from the host interface.

6. A prefetching method, comprising:

generating a current address for reading out current texture data stored in a video memory in a current read operation;

determining whether the current address is identical to a prefetch address stored in a buffer memory;

outputting prefetched texture data stored in the buffer memory if the current address is identical to the prefetch address;

addressing current texture data corresponding to the current address, if the current address is not identical to the prefetch address;

determining whether prefetching of next texture data is possible;

prefetching next texture data predicted to be used in a next read operation in the video memory based on the current address and a directional signal generated by a mode register, if the prefetching is possible; and storing the prefetched next texture data and its corresponding next address into the buffer memory, if the prefetching is performed.

7. A method of prefetching texture data in a video controller, comprising generating a current address for reading out current texture data stored in a video memory in a current reading operation;

generating a directional signal for prefetch texture data predicted to be used in a next reading operation;

producing a prefetch address for the prefetch texture data based on the directional signal and the current address;

accessing the prefetch texture data corresponding to the prefetch address via the memory interface;

storing the prefetch texture data and the prefetch address.

* * * * *